United States Patent [19]

Tuson et al.

[11] 4,250,918
[45] Feb. 17, 1981

[54] ROTARY JOINT DEVICE WITH MULTIPLE PIPING PASSAGES, IN PARTICULAR FOR LOADING OR TRANSFER COLUMNS ON MARINE SITES

[75] Inventors: Samuel Tuson, Mesnil-le-Roi; Jean-Pierre Ghilardi, La Bouffemont, both of France

[73] Assignee: Entrepise d'Equipments Mechanique set Hydrauliques E.M.H., France

[21] Appl. No.: 970,179

[22] Filed: Dec. 18, 1978

[30] Foreign Application Priority Data

Dec. 30, 1977 [FR] France ............................ 77 39823

[51] Int. Cl.³ ..................... F16L 27/00; F16L 39/04
[52] U.S. Cl. .................................. 137/580; 285/134; 285/136
[58] Field of Search ............... 137/580; 285/134 R, 285/136

[56] References Cited

U.S. PATENT DOCUMENTS

| | | | |
|---|---|---|---|
| 2,404,494 | 7/1946 | Halby et al. | 285/134 |
| 2,701,146 | 2/1955 | Warren | 285/134 |
| 3,698,433 | 10/1972 | Dobler et al. | 137/615 |
| 3,910,309 | 10/1975 | Kaiser | 137/580 |
| 3,990,731 | 11/1976 | Schnipke | 285/136 |
| 4,142,742 | 3/1979 | Cornett et al. | 285/136 |
| 4,174,127 | 11/1979 | Corn et al. | 285/136 |

FOREIGN PATENT DOCUMENTS 2104606  3/1972  France .

Primary Examiner—Martin P. Schwadron
Assistant Examiner—A. Michael Chambers
Attorney, Agent, or Firm—Steinberg & Raskin

[57] ABSTRACT

This invention relates to a rotary joint device with multiple piping passages and piping 3,4 eccentric to the axis of rotation X—X of the rotary joint, comprising stationary 1 and rotary 2 portions as well as a coaxial rotary member 7 interposed between the stationary 1 and rotary 2 portions and traversed by conduits 8,9 communicating permanently with the stationary conduits 3a, 4a of pipings 3,4 and with the rotary conduits 3b, 4b of pipings 3,4 through a connecting path 10,11.

9 Claims, 10 Drawing Figures

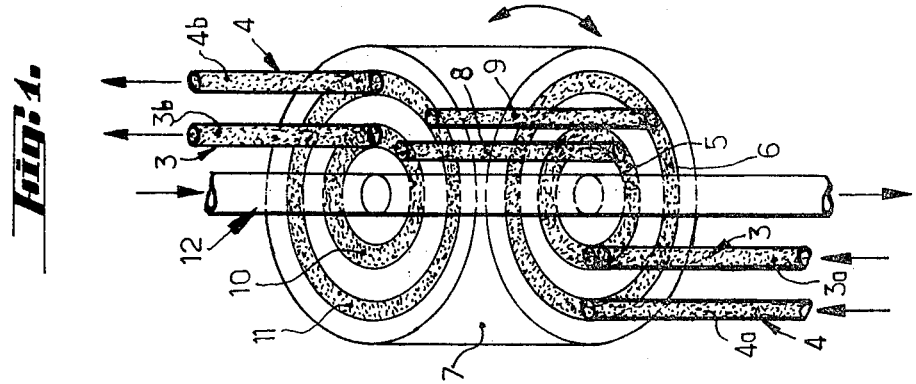
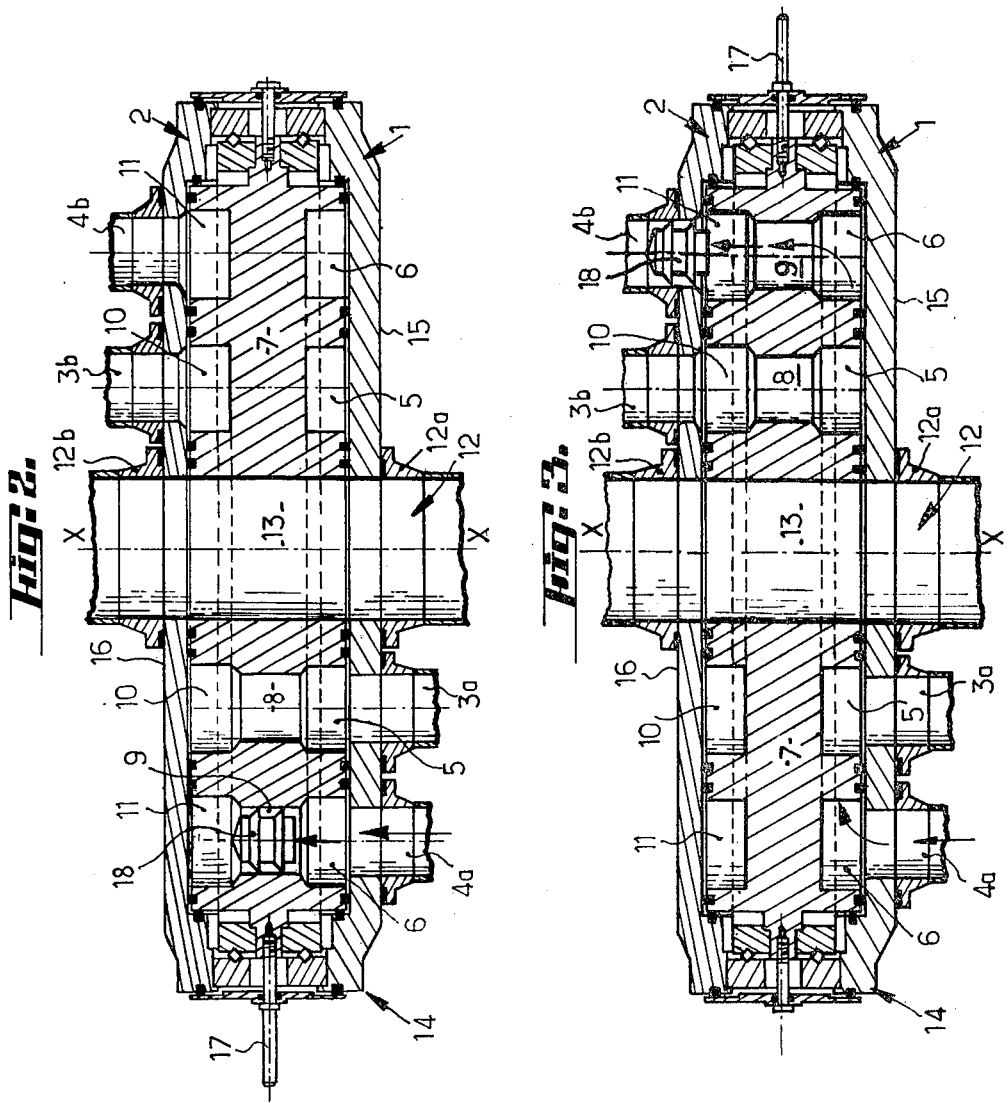
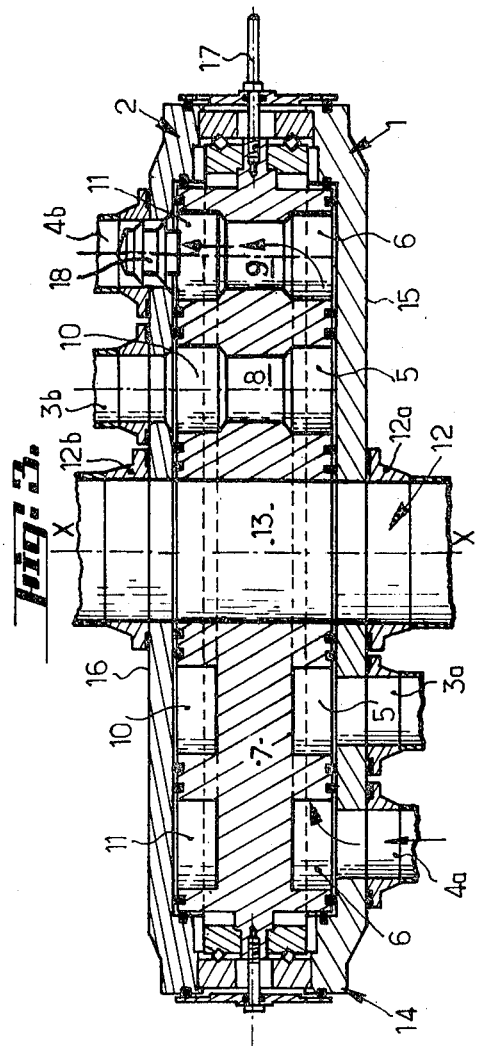

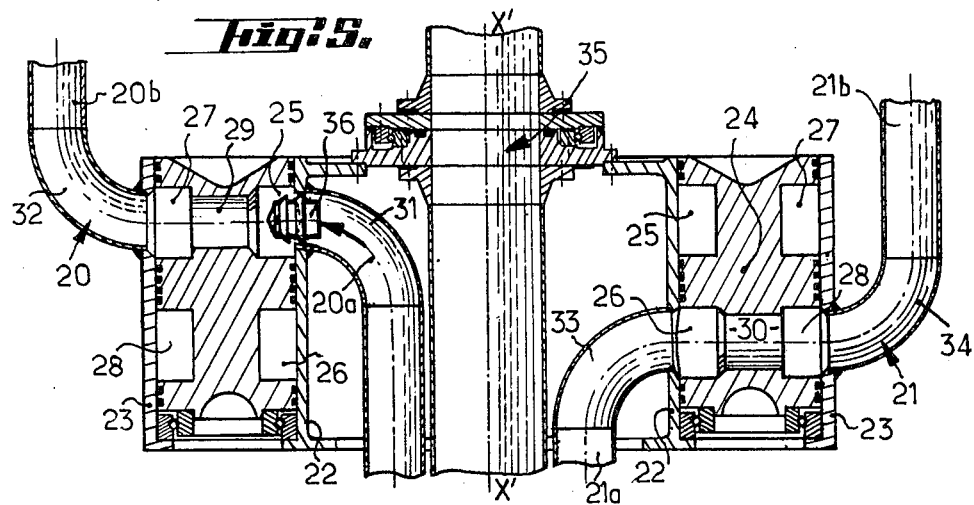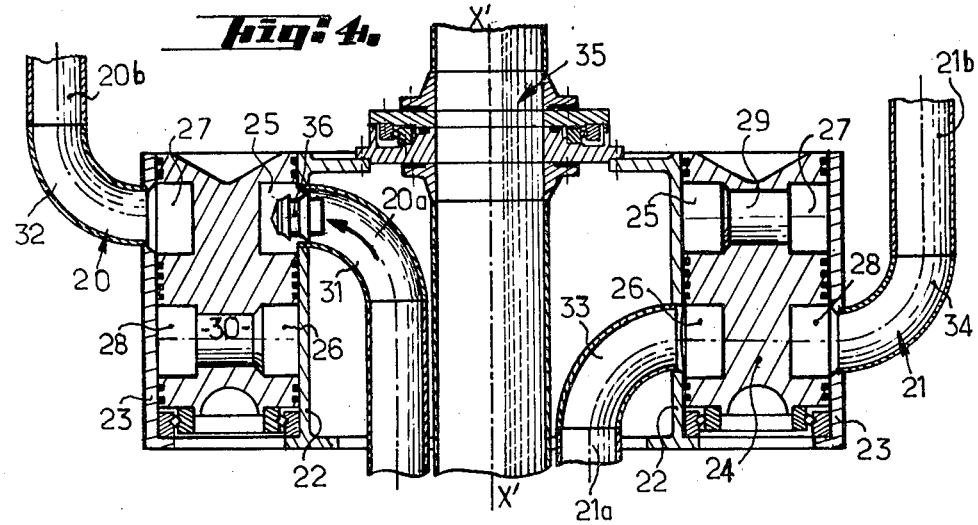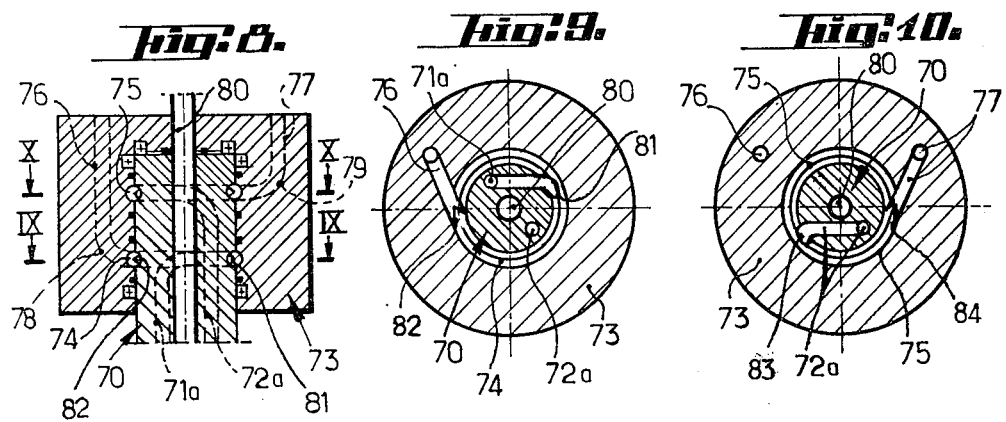

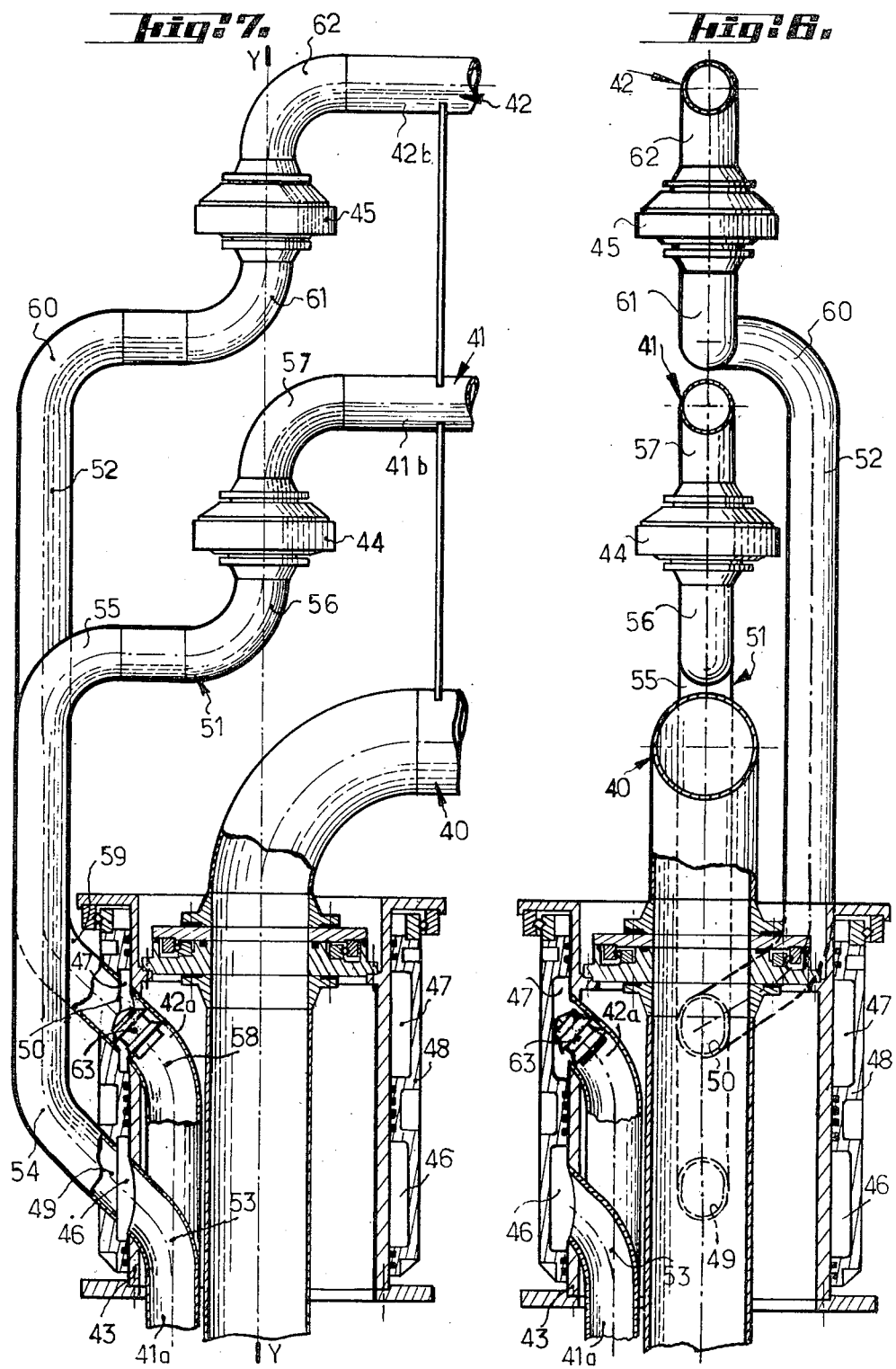

ROTARY JOINT DEVICE WITH MULTIPLE PIPING PASSAGES, IN PARTICULAR FOR LOADING OR TRANSFER COLUMNS ON MARINE SITES

The present invention has essentially for its object a rotary joint device with multiple piping passages, particularly for loading or transfer columns on marine sites.

Rotary joints with multiple piping passages are already known which comprise a stationary portion and a rotary portion. Usually, at least one piping is eccentric to the axis of rotation of the rotary joint. The said piping is constituted, on the one hand, by a first, stationary conduit secured to the stationary portion of the rotary joint and, on the other hand, by a second, rotary conduit variable in angular position and connected to the rotary portion of the rotary joint. The first conduit and the second conduit communicate with one another through a first substantially concentric, annular duct provided in the joint.

Owing to this rotary joint, the second, rotary conduit, e.g. one supplying a tanker, can follow the heaving motion of the latter, e.g. during its loading. Such pipings, however, must be cleaned from time to time. The cleaning is usually performed by passing scraper tools or pipe cleaners such as for example spherical balls. A major drawback to the above-described rotary joint is that it includes a change of direction through 90° between the first, stationary conduit and the annular duct or between the annular duct and the second, rotary conduit, thus making it impossible for the tool to pass.

It is therefore the purpose of the present invention to remedy the afore-mentioned drawbacks to the known rotary joints by providing a solution allowing the scraper tool or pipe cleaner to pass easily through the joint, e.g. from the first, stationary conduit into the second, rotary conduit.

The solution according to the invention is provided by a rotary joint device with multiple piping passages of the above-described type, characterized in that it comprises a coaxial rotary member interposed between the stationary portion and the rotary portion of the rotary joint, or merging in the said rotary portion and traversed by at least one conduit communicating permanently with the first conduit through the first annular duct and with the second conduit through a connecting path, the said conduit being so arranged as to be movable, by rotating the said member, into substantially aligned prolongation of at least the said first conduit. Avantageously, the rotary member is substantially in a shape of a drum or the like.

According to a first characterizing feature, the rotary portion of the joint is mounted on the drum rotatably and the drum comprises at least partially a second annular duct forming the said connecting path and into which opens the said second, rotary conduit, the said first and second annular ducts being interconnected by the said conduit, the latter being substantially rectilinear.

According to another characterizing feature, each piping is provided with its own rotary joint, the said rotary joints are coaxially aligned and have a common stationary portion and a common drum, the rotary portions of the said joints are connected to the drum through intermediate conduits forming the said connecting path and adapted to rotate about the common axis of rotation of the rotary joints.

Other purposes, advantages and characterizing features of the present invention will appear more clearly as the following explanatory description proceeds with reference to the appended drawings illustrating four presently preferred forms of embodiment of the present invention given solely by way of example.

In the drawings:

FIG. 1 is a schematic diagrammatic perspective view of a first form of embodiment of a multiple-passage rotary joint according to the present invention;

FIG. 2 is an axial sectional view of the rotary joint shown in FIG. 1, wherein each conduit of the drum extends in substantially aligned prolongation of each first, stationary conduit;

FIG. 3 is an axial sectional view similar to FIG. 2, wherein each conduit of the drum extends in substantially aligned prolongation of each second, rotary conduit;

FIG. 4 is an axial sectional view of a second form of embodiment of a rotary joint device with multiple piping passages according to the present invention, wherein each second, rotary conduit of the joint is represented, for the sake of clarity, in the specific case where it extends opposite its associated, first stationary conduit, whereas each conduit of the drum does not extend in prolongation of any conduit;

FIG. 5 is an axial sectional view similar to that of FIG. 4, wherein each drum conduit extends in substantially aligned prolongation of the first, stationary conduit and the second, rotary conduit;

FIG. 6 is an axial sectional, partially broken-away view of a third form of embodiment of a rotary joint device according to the present invention, wherein each conduit of the drum is in a non-aligned position;

FIG. 7 is an axial sectional, partially broken-away view similar to that of FIG. 6, wherein each conduit of the drum extends in substantially aligned prolongation of its associated first, stationary conduit;

FIG. 8 is a diagrammatic axial sectional view of a fourth form of embodiment of a rotary joint device according to the present invention, wherein the rotary portion of the joint is merged in the drum;

FIG. 9 is a sectional view upon the line IX—IX of FIG. 8;

FIG. 10 is a sectional view upon the line X—X of FIG. 8.

Referring to FIGS. 1 to 3, a device according to the present invention forming a rotary joint with multiple piping passages, e.g. for three pipings, comprises a stationary portion 1 and a rotary portion 2. The device includes at least one piping 3, 4 eccentric to the axis of rotation X—X of the rotary joint. Each eccentric piping 3, 4 is constituted, on the one hand, with a first, stationary conduit 3a, 4a, respectively, secured to the stationary portion 1 of the rotary joint, and, on the other hand, by a second, rotary conduit 3b, 4b, respectively, which is variable in angular position and connected to the rotary portion 2 of the joint. The first conduit 3a, 4a and the second conduit 3b, 4b, respectively, communicate with one another through a first, substantially concentric annular duct 5, 6, respectively, provided in the joint. The device also comprises a coaxial rotary member 7, preferably in the shape of a drum or the like, interposed between the stationary portion 1 and the rotary portion 2 of the rotary joint and traversed by at least one conduit 8, 9 communicating permanently with the first conduit 3a, 4a, respectively, through the said first annular duct 5, 6, respectively, and with the second, rotary conduit 3b, 4b through a connecting path 10, 11, respectively. The conduit 8, 9 is so arranged as to be movable, by rotating the rotary member 7, to a position in substantially aligned prolongation of at least the first conduit 3a, 4a, respectively.

The device also includes a piping 12 coaxial with the joint and including a first, stationary conduit 12a and a second conduit 12b communicating with one another through a conduit 13 coaxial with the rotary member 7.

Avantageously, the first annular duct 5, 6 is defined between the rotary member or drum 7 and the stationary portion 1, as is clearly seen in FIGS. 2 and 3.

In the example illustrated in FIGS. 1 to 3, the rotary portion of the joint is rotatably mounted on the drum 7 and the latter comprises at least partially a second annular duct forming the aforesaid connecting path 10, 11 and into which opens the second, rotary conduit 3b, 4b, respectively. Furthermore, the first (5,6) and second (10, 11, respectively) annular ducts are interconnected by the aforesaid conduit (8,9, respectively), which is substantially rectilinear.

The device preferably comprises a closed hollow cylindrical casing 14, one side-wall 15 of which is formed by the stationary portion 1 of the joint, whereas its opposite side-wall 16 is constituted by the rotary portion 2 of the joint, the drum 7 being constituted by a cylindrical body mounted within the casing 14. Each first conduit 3a, 4a and second conduit 3b, 4b connects with the corresponding side-wall (15, 16, respectively) of the joint, in parallel relationship to the axis of rotation X—X of the latter.

Advantageously, in the device assumed to comprise several eccentric pipings 3, 4 as illustrated, the respectively associated annular ducts of each group of first (5, 6) or second (10, 11) annular ducts respectively associated with the said pipings (3, 4, respectively) are concentric and radially spaced, the first (5, 6) and second (10, 11) annular ducts of a same piping (3, 4, respectively) are coaxial and axially spaced.

The above-described device operates as follow.

The rotary portion 2 of the joint, to which the second conduit 3b, 4b, are secured, having performed a rotation in order to follow the motion of the tanker caused in particular by heave, is for example in the position shown in FIGS. 1 to 3, wherein the second conduits 3b, 4b are diametrically opposite the first conduits 3a, 4a. The drum is for example in the initial position shown in FIG. 1, wherein the conduits 8, 9 are in an intermediate position between the first conduits 3a, 4a, and the second conduits 3b, 4b.

The drum 7 is rotated, e.g. by manual control means 17 or any other control means, until each conduit 8, 9 reaches a position in substantially aligned prolongation of the first conduit 3a, 4a respectively, as shown in FIG. 2. At least one scraper tool or piping cleaner such as a cylindrical tool 18 is then introduced by exerting an appropriate fluid flow and pressure. The cylindrical tool 18 moves up through, for example, the first conduit 4a under the action of the said pressure until it is trapped in the corresponding conduit 9 of the drum as illustrated in FIG. 2.

A further rotation of the drum 7 is then performed so as to move each conduit 8, 9 to a position in substantially aligned prolongation of the second conduit 3b, 4b, respectively. Under the action of the fluid pressure still present in the piping 4, the cylindrical tool 18 is projected through the second piping 4b. It is therefore readily understood that the device according to the invention allows a scraper tool or pipe cleaner to be readily passed along the whole internal path of the piping and in particular through the rotary joint even if the piping is eccentric to the axis of rotation of the rotary joint. Such eccentric piping can therefore be adequately cleaned as mentioned previously.

According to a second form of embodiment illustrated in FIGS. 4 and 5, the rotary joint device according to the invention, when used for eccentric pipings 20, 21, comprises two radially spaced, concentric cylindrical stationary and rotary casings 22 and 23, respectively, between which is mounted an annular cylindrical barrel 24. The casings 22, 23 form the aforesaid stationary and rotary portions, respectively, of the rotary joint. In this form of embodiment, the first (25, 26) and second (27, 28) annular ducts of a same piping (20, 21, respectively) are concentric and radially spaced. The first conduit (20a, 21a) and second conduit (20b, 21b, respectively) of a same piping (20, 21) open radially into their associated annular ducts 25, 27); (26, 28) which communicate with one another through the said conduit 29, 30, respectively.

Furthermore, each conduit 20a, 20b; 21a, 21b extends generally and at least partially in parallel relationship to the axis of rotation X'—X' of the joint and connects with the latter through a bent portion (31, 32; 33, 34, respectively) of rounded shape with a sufficiently large radius of curvature to allow a scraper tool to be passed therethrough. The device also comprises a piping 35 coaxial with the axis of rotation X'—X' of the rotary joint.

The rotary joint according to this second form of embodiment operates in a similar manner to the previously described, first form of embodiment, as follows.

The rotary portion of the joint being in the particular position wherein the second conduit 20b, 21b of the piping 20, 21, respectively, extends opposite the first, stationary conduit 20a, 21b, respectively, and the drum 24 being in any position, as shown in FIG. 4, a cylindrical tool 36 consisting of a scraper tool or pipe cleaner fed through the first, stationary conduit 20a is trapped in the first annular duct 25 (see FIG. 4). The drum 24 is then rotated until each conduit 29, 30 thereof reaches a position in substantially aligned prolongation of the first conduit 20a, 21a, respectively, as illustrated in FIG. 5. In each particular case, each conduit 29, 30 also extends in prolongation of the second conduit 20b, 21b, respectively. The cylindrical tool 36 is then projected through the conduit 29 and then through the second conduit 20b under the action of the fluid pressure produced in the first conduit 20a. The cleaning of the piping 21 is performed in the same manner.

Of course, when the rotary portion 23 of the joint is in a different position wherein the second conduit 20b, 21b does not extend in prolongation of the first conduit 20a, 21a, respectively, the passage of the cylindrical tool 36 through the joint is performed in two stages, as mentioned in connection with the first form of embodiment illustrated in FIGS. 1 to 3.

Referring to FIGS. 6 and 7 illustrating a third form of embodiment of a device according to the present invention, the latter comprises for example an axial piping 40 and two pipings 41, 42 eccentric to the axis of rotation Y—Y of the rotary joint. As in the other forms of embodiment described above, each eccentric piping 41, 42 is constituted, on the one hand, by a first, stationary conduit 41a, 42a, respectively, secured to the stationary portion 43 of the joint and, on the other hand, by a second, rotary conduit 41b, 42b, respectively, which is variable in angular position and connected to the rotary portion (44, 45) of the rotary joint. The first (41a, 42a) and second (41b, 42b, respectively) conduits communicate with one another through the medium of a first, substantially concentric annular duct 46, 47, respectively, provided in the joint. This form of embodiment also comprises a drum or the like 48 interposed between the stationary portion 43 and the rotary portion (44, 45) of the rotary joint and traversed by at least one conduit 49, 50, respectively, communicating permanently with the first conduit 41a, 42a, respectively, through the first annular duct 46, 47, respectively, and with the second conduit 41b, 42b, respectively, through a connecting path 51, 52, respectively.

It will be observed that, in this case, each piping 41, 42 is provided with its own rotary joint. The rotary joints are coaxially aligned, have a common stationary portion 43 and a common drum 48. The rotary portions 44, 45 of the joints are connected with the drum 48 through intermediate conduits 51, 52 forming the aforesaid connecting path and adapted to rotate about the common axis of rotation Y—Y of the rotary joints.

Advantageously, the common stationary portion 43 is in the shape of a hollow cylindrical casing surrounded by the annular cylindrical drum 48. The intermediate conduit 51, 52 and the first conduit 41a, 42a of each piping 41, 42 open into a same annular duct 46, 47, respectively, defined between the drum 48 and the stationary casing 43. Preferably, the conduits 41a, 42a, 51, 52, 41b, 42b extend generally, at least partially, in parallel relationship to the axis of rotation Y—Y of the joint and connect with the common stationary portion 43, the drum 48 and the movable portions 44, 45 of the rotary joints respectively through bent or elbow portions (53 to 62) of round shape with a sufficiently large radius of curvature to allow a scraper tool to be passed therethrough.

The rotary joint according to this third form of embodiment operates as follow.

Starting from an arbitrary position, shown in FIG. 6, wherein the conduit 49, 50 of the drum 48 does not extend in prolongation of the first conduit 41a, 42a, respectively, a scraper tool, such as a cylindrical tool 63, proceeding for example from the first, stationary conduit 42a is trapped against the annular duct 47. The drum 48 is rotated so as to move its conduit 49, 50, respectively, to a position where it extends in substantially aligned prolongation of the first conduit 41a, 42a, respectively, as represented in FIG. 7. In that position, the cylindrical tool 63 acted upon by the pressure produced in the first conduit 42a, passes through the conduit 50, the intermediate conduit 52 and the second conduit 42b.

Advantageously, the drum 48 is permanently maintained in a position wherein the conduit 49, 50 of the drum 48 extends in prolongation of the first conduit 41a, 42a, respectively, as illustrated in FIG. 7, thus allowing for direct passage of the scraper tool 63.

In the forms of embodiment of FIGS. 1 to 7, each circular annular duct of the drum is cleaned by a scraper arranged freely in the said annular duct which is mounted therein permanently and the displacement of which is caused particularly by the rotation of the rotary portion of the joint.

According to a fourth form of embodiment of a device according to the invention, illustrated in FIGS. 8 to 10, the stationary portion of the joint is constituted by a solid cylindrical element 70 in which is provided each aforesaid first conduit 71a, 72a of the eccentric pipings 71, 72, respectively. The rotary portion of the joint, here, is merged in the drum 73 which is substantially in the shape of a sleeve mounted rotatably on the element 70. Each first conduit 71a, 72a opens into an annular duct 74, 75, respectively, which also communicates with a conduit 76, 77, respectively, provided in the drum 73.

Advantageously, the conduit 76, 77 of the drum 73 opens tangentially into the first annular duct 74, 75, respectively (see FIGS. 9 and 10), and comprises at least one round-shaped bend or elbow portion 78, 79, respectively, the radius of curvature of which is sufficiently large to allow a scraper tool to pass therethrough. Furthermore, each said second conduit connects with the corresponding conduit 76, 77, in parallel relationship to the axis of rotation of the joint.

Each first conduit 71a, 72a and each conduit 76, 77 are provided with fork members 81, 83; 82, 84 for guiding the passage of the scraper tool from the first conduit 71a, 72a into the conduit 76, 77. The shape of the fork members is also so designed as to prevent them from interfering with the rotation of the drum 73.

In case the device considered comprises several eccentric pipings, as illustrated, the first annular ducts 74, 75 of the pipings 71, 72, respectively, are axially spaced from one another. This also applies to the two forms of embodiment illustrated in FIGS. 4 to 7.

The device also comprises the piping 80 coaxial with the axis of rotation of the rotary joint.

In this fourth form of embodiment, where each conduit 76, 77 of the drum 73 opens tangentially into the first annular duct 74, 75, respectively, a scraper tool, such as a spherical ball, may easily pass for example from the first conduit 71a into the annular duct 74 and then the duct 76 in practically all the positions of the drum 73 with respect to the stationary portion 70, except, of course, for the positions where each conduit 76, 77 extends partially in prolongation of the first conduit 71a, 72a, respectively. In this specific case, care must only be taken either to avoid cleaning the conduit when the drum 73 is in those positions or to cause or await the rotation of the drum allowing the passage of the scraper tool.

It should be noted that, in all the above forms of embodiment, each piping is substantially uniform in section throughout its length and, in particular, each annular duct has a flow or passage section corresponding substantially to that of the first and second conduits constituting the said piping.

Of course, the invention is by no means limited to the forms of embodiment described and illustrated which have been given by way of example only. In particular, it comprises all means constituting technical equivalents to the means described as well as their combinaisons, should the latter be carried out according to its gist and used within the scope of the following claims.

What is claimed is:

1. In a rotary joint device with multiple piping passages including a stationary portion and a rotary portion, at least one piping eccentric to the axis of rotation of the said rotary joint and constituted by a first, stationary conduit secured to the stationary portion of said rotary joint and by a second, rotary conduit variable in angular position and connected to said rotary portion, said first and second conduits communicating with one another through a first, substantially concentric annular duct provided in the joint, the improvement comprising: a coaxial rotary member interposed between said stationary and rotary portions mounted so as to be rotatable independently of said rotary portion and having at least one conduit formed therethrough communicating permanently with the first stationary conduit through said first annular duct and with the second rotary conduit through a connecting path, said at least one conduit being so arranged as to be movable, by rotating said coaxial rotary member, into substantial alignment with at least said first conduit, whereby a scraper tool or pipe cleaner can thereby easily pass through the joint.

2. A device according to claim 1, wherein the rotary member is substantially drum-shaped.

3. A device according to claim 2, characterized in that said first annular duct is defined between said drum-shaped rotary member and said stationary portion.

4. A device according to claim 3, wherein the rotary portion of said joint is rotatably mounted on said drum-shaped rotary member and the latter comprises at least partially a second annular duct forming said connecting path and into which the said second, rotary conduit opens, said first and second annular ducts being fluidly interconnected by said at least one conduit, which is substantially rectilinear.

5. A device according to claim 4, characterized in that the rotary joint for the eccentric pipings comprises two radially spaced, concentric cylindrical casings, one of which is stationary and the other rotatable, and between which is mounted the said drum, which is annular cylindrical, the said casings forming the stationary portion and the rotary portion, respectively, of the rotary joint, the first and second annular ducts of a same piping are concentric and radially spaced, the first and second conduits of a same piping open radially into their associated annular ducts, each conduit extends generally, at least partially, in parallel relationship to the axis of rotation of the joint and connects with the latter through a bent or elbow portion of round shape with a sufficiently large radius of curvature to allow said scraper tool to pass therethrough.

6. A device according to claim 4, characterized in that it comprises a closed hollow cylindrical casing having one side-wall formed by said stationary portion of the joint, and an opposite side-wall constituted by said rotary portion of the joint, said drum-shaped rotary member being constituted by a cylindrical body arranged within said casing, and wherein each of said first and second conduits connects with a respective side-wall of the joint in parallel relationship to the axis of rotation of the latter.

7. A device according to claim 6, including a plurality of eccentric pipings, wherein the annular ducts respectively associated with each group of first and second annular ducts respectively associated with said pipings being concentric and radially spaced, the first and second annular ducts of each piping being coaxial and axially spaced.

8. A device according to claim 1, wherein each piping is provided with its own rotary joint, the said rotary joints being coaxially aligned and having a common stationary portion and a common drum, the rotary portions of the said joints being connected with the drum through intermediate conduits forming said connecting path and adapted to rotate about the common axis of rotation of the rotary joint.

9. A device according to claim 8, characterized in that the common stationary portion is in the shape of a hollow cylindrical casing surrounded with the said drum, which is annular cylindrical, the intermediate conduit and the first conduit of each piping open into a same annular duct defined between the drum and the said stationary casing, in that, preferably, the conduits extend generally, at least partially, in parallel relationship to the axis of rotation of the joint and connect with the common stationary portion, the drum and the movable portions of the rotary joints, respectively, through bent or elbow portions of round shape with a sufficiently large radius of curvature to allow said scraper tool to pass therethrough.

* * * * *

UNITED STATES PATENT AND TRADEMARK OFFICE
CERTIFICATE OF CORRECTION

PATENT NO. : 4,250,918

DATED : February 17, 1981

INVENTOR(S) : Samuel Tuson, et al.

It is certified that error appears in the above—identified patent and that said Letters Patent is hereby corrected as shown below:

On the cover sheet Insert:

-- (73) Assignee: Entreprise D'Equipements Mecaniques Et Hydrauliques E.M.H. Boulogne, Billancourt, France --.

Signed and Sealed this

Eighth Day of September 1981

[SEAL]

Attest:

Attesting Officer

GERALD J. MOSSINGHOFF

Commissioner of Patents and Trademarks